April 3, 1928.   N. A. CHRISTENSEN   1,664,451
DUPLEX BRAKE
Filed Feb. 19, 1925   4 Sheets-Sheet 1

INVENTOR.
NIELS A. CHRISTENSEN.
BY
ATTORNEYS.

April 3, 1928.　　　　　　　　　　　　　　　　1,664,451
N. A. CHRISTENSEN
DUPLEX BRAKE
Filed Feb. 19, 1925　　　　4 Sheets-Sheet 2
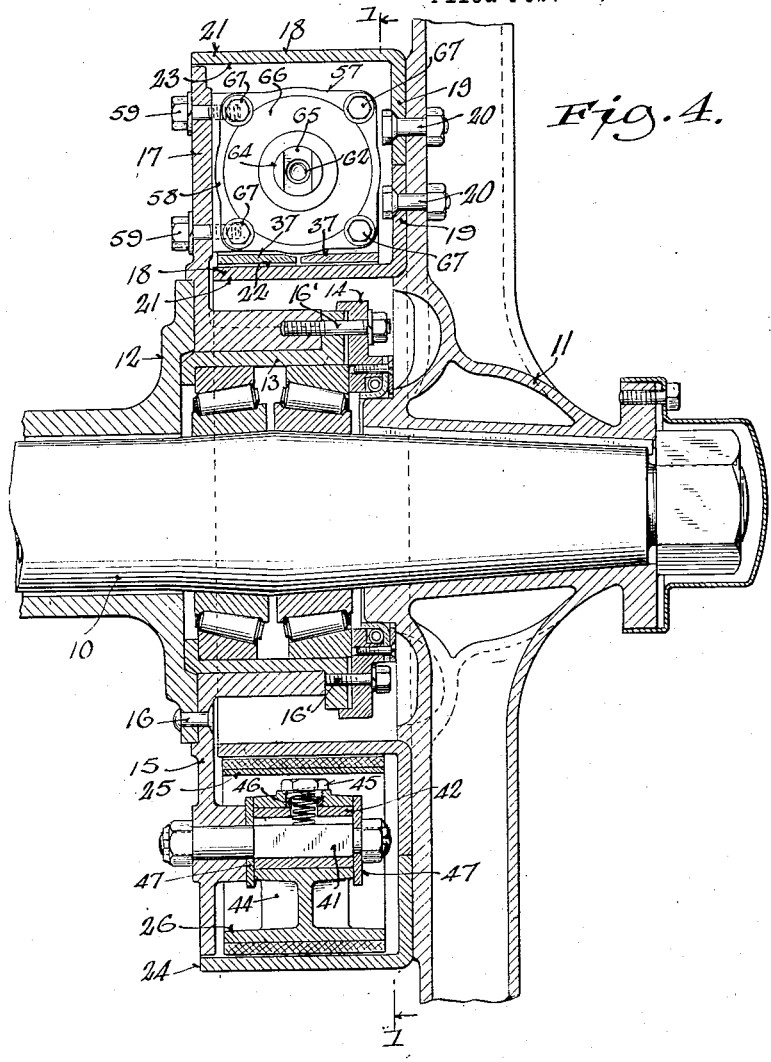
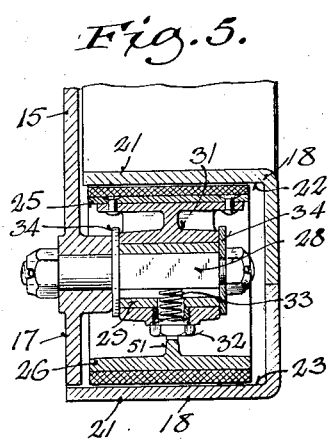
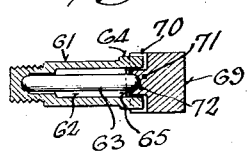
INVENTOR.
NIELS A. CHRISTENSEN
BY
ATTORNEYS.

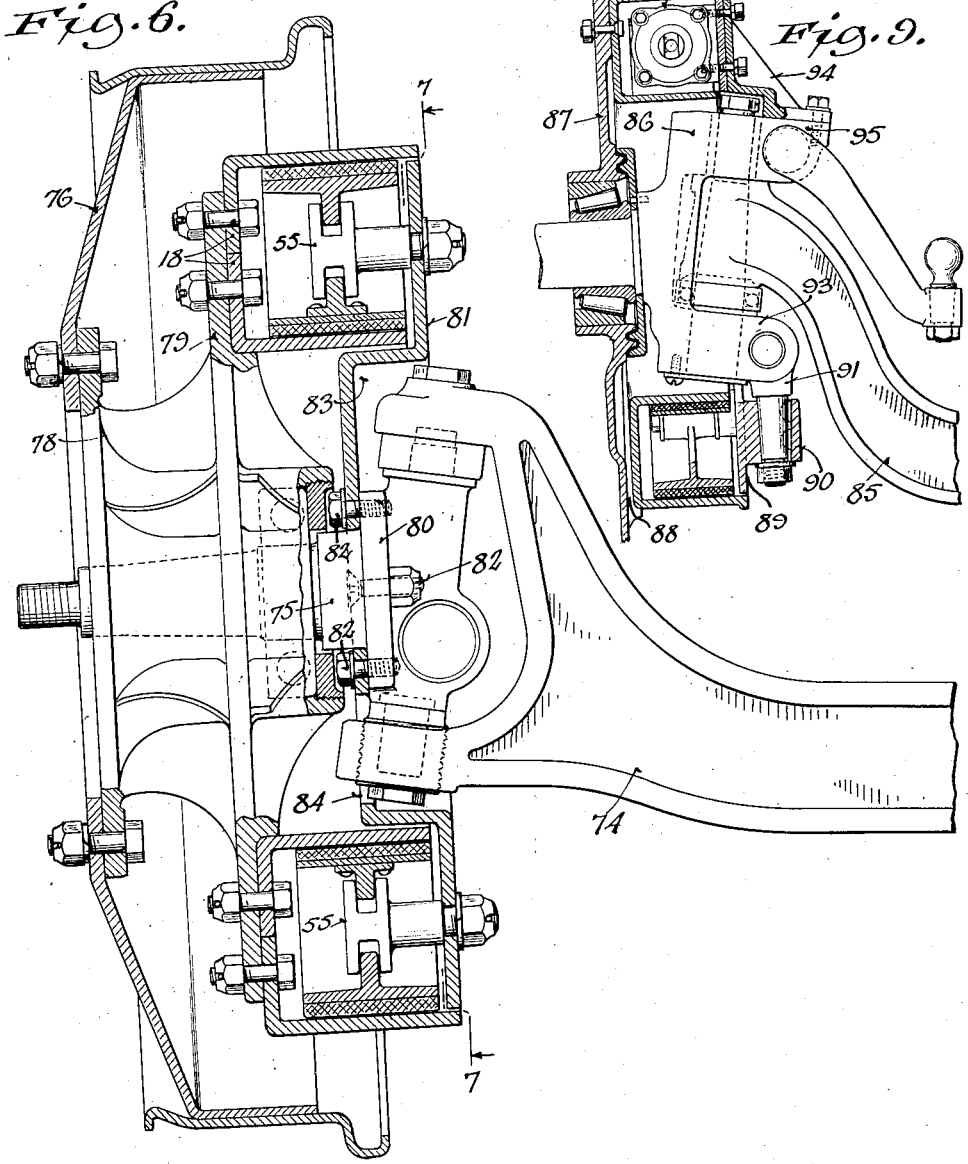

April 3, 1928. 1,664,451

N. A. CHRISTENSEN

DUPLEX BRAKE

Filed Feb. 19, 1925 4 Sheets-Sheet 4

INVENTOR.
NIELS A. CHRISTENSEN.
BY
ATTORNEYS.

Patented Apr. 3, 1928.

1,664,451

UNITED STATES PATENT OFFICE.

NIELS A. CHRISTENSEN, OF MILWAUKEE, WISCONSIN.

DUPLEX BRAKE.

Application filed February 19, 1925. Serial No. 10,287.

The invention relates to brakes for automotive vehicles and trailers for such vehicles.

The general objects of the invention are to provide brake mechanism of the character above specified so constructed and arranged as to exclude grease and dirt from the brake surfaces; to provide a complete enclosure of the working parts; to provide a very large increase of braking surface in comparison with the usual brakes; to provide a large exposed area or cooling surface of those parts subject to heat by brake friction to more readily dissipate such heat; and to provide a brake construction that makes it possible to use readily fashioned parts.

A further object of the invention is to provide vehicle brake mechanism in which a brake drum of U-shape in cross-section is engaged by an expanding brake and a contracting brake, said brakes being associated with a fluid-pressure motor for actuating them.

The invention further consists in the several features hereinafter set forth and more particularly defined by claims at the conclusion hereof.

In the drawings: Fig. 1 is a vertical sectional view taken on the line 1—1 of Fig. 4, through brake mechanism embodying the invention, and more particularly the rear wheel;

Fig. 4 is a section taken on the line 4—4 of Fig. 1 the brake cylinder being shown in full;

Fig. 5 is a detail sectional view taken on the line 5—5 of Fig. 1;

Fig. 6 is a vertical sectional view, taken on the line 6—6 of Fig. 7, of brake mechanism for the front wheel used with an Elliott type axle;

Fig. 9 is a view similar to Fig. 6, showing the application of brake mechanism embodying the invention to a reverse Elliott type front wheel axle;

Fig. 10 is a detail sectional view taken on the line 10—10 of Fig. 1.

Figure 1:
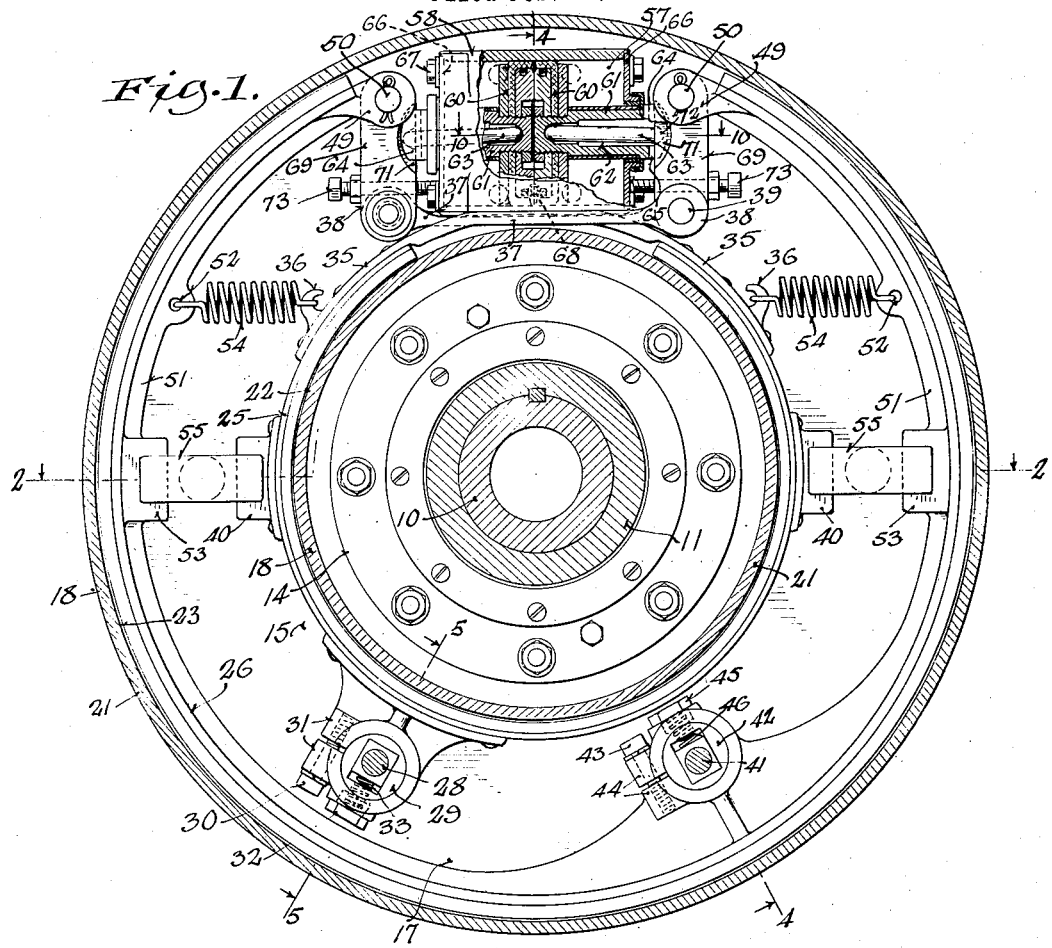
Figure 2:
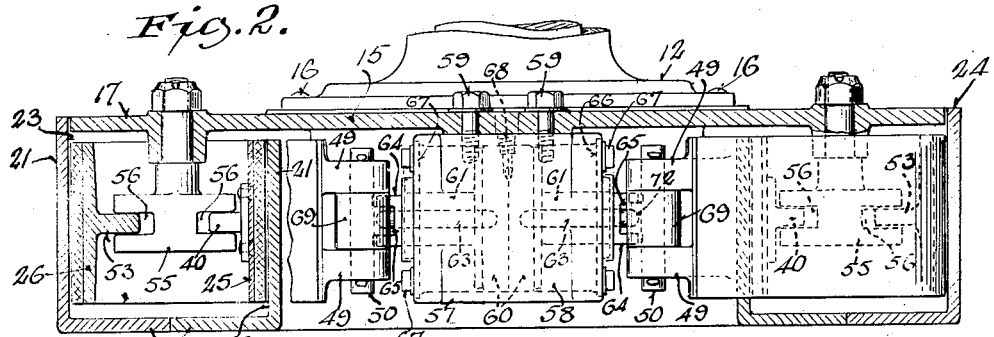
Fig. 2 is a sectional view taken on the broken section line 2—2 of Fig. 1.

Referring to Figs. 1 to 5, inclusive, of the drawings, the numeral 10 designates the rear axle, 11 the rear spoked wheel driven thereby, 12, 13 and 14 parts of the rear axle housing and 15 another part of said housing secured by rivets 16 to the part 12 and by bolts 16' to the parts 13 and 14, said part 15 having an annular disk portion 17 carrying the brakes and their operating means.

The brake drum is secured to the wheel 11 and is preferably in the form of two annular complementary steel stampings 18 having their base portions 19 facing each other and secured to the wheel 11 by bolts 20 and their annular brake portions 21 spaced apart and concentrically disposed whereby a brake drum of U-shape in cross-section is provided, having brake surfaces 22 and 23. It will, of course, be understood that instead of the pair of stampings 18 the brake drum may be made in one piece, as a casting and machined to the finished size. The disk portion 17 of the rear axle housing is disposed adjacent the open end of the brake drum so as to cover the same, the outer edge 24 of the drum preferably extending over the outer periphery of said disk.

A suitably lined contracting brake shoe or band 25 is adapted to engage the brake surface 22 and a suitably lined expanding brake shoe or band 26 is adapted to engage the brake surface 23. Both of these bands work within the confines of the drum.

Figure 3:
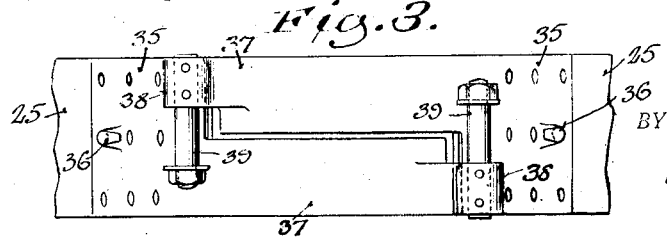
Fig. 3 is an elevation view of the end portions of the inner brake band.

The brake band 25 is supported on the part 15 by an anchor pin 28 secured thereto and having a flat-sided portion slidably mounted in a slotted block 29 clamped by a bolt 30 between the split portions of a lug 31 secured to said band, said lug having a box-nut 32 in which a spring 33, bearing upon the anchor pin, is seated. said spring normally acting to move the intermediate parts of the band away from the adjacent drum surface 22 (Figs. 1 and 5). The lug 31 is laterally guided on the anchor pin by washers 34 mounted on said pin in spaced relation. The band 25 has end parts or lugs 35 riveted thereto with spring anchor hooks 36 and with parts 37 in parallel relationship, and having eyed portions 38 to which pins or bolts 39 are pinned (Fig. 3). The band 25 also has diametrically disposed guide lugs 40 secured thereto.

The band 26 is supported on the part 15 by an anchor pin 41 secured thereto and having a flat-sided portion slidably mounted in a slotted block 42 clamped by a bolt 43 between the split portions of a lug 44 secured to said band, said lug carrying a box-nut 45 in which a spring 46, bearing upon the anchor pin, is seated, said spring normally acting to move the intermediate parts of the band away from the adjacent drum surface 23 (Figs. 1 and 4). The lug 44 is laterally guided upon the anchor pin by washers 47 mounted upon said pin in spaced relation. The band 26 has spaced eyed portions 49 formed therein to take pins 50. This band also has a centrally disposed web 51 having spring anchor holes 52 therein and flat-sided lug portions 53.

A spring 54 having one end hooked through the hole 52 and the other engaged with the hook 36 at adjacent ends of both bands 25 and 26 acts to release the free ends of said band from engagement with the brake drum. To keep the band in proper alinement, I also provide guide members 55 bolted to the disk 17 and having slotted portions 56 in which a part of the lugs 40 and the parts 53 are slidably mounted.

A fluid-pressure motor 57 has its cylinder 58 secured by bolts 59 to the disk 17 and is mounted within the sides of the U-shaped brake drum. This motor may be of any suitable construction and is here shown as provided with a pair of opposed, suitably packed pistons 60 working in said brake cylinder and having piston rods 61, each provided with a bore 62 in which a thrust-pin 63 is mounted, said piston rods also having enlarged heads 64 which have slots 65. Covers 66 are secured in any suitable manner to the brake cylinder, as by screws 67. A port 68 leading into the central part of the cylinder is adapted to be connected by a suitable pipe fitting, not shown, but extending through the disk 17 to the air system for admitting compressed air or other pressure fluid between the pistons, and for the release of such fluid from the brake cylinder.

The outward movement of said pistons is used to effect the application of both bands to the drum through the action of said pistons and their thrust pins upon floating levers 69. Each lever 69 is connected at one end by the pin 50 on one end of the band 26 and to the pin 39 on the opposite end of the band 25. Each lever is recessed, as at 70, so as to form a tongue 71 mounted in the slot 65 in the head of the piston rod so as to keep the end of the band alined relative to the drums and has a recess 72 formed therein to take the rounded end of the thrust-pin 63, it being noted that the other end of said pin is also rounded and bears against the inner end of the bore 62, and that it has some play therein so as to readily accommodate the changing position of the lever 69 and still maintain the thrust substantially central of the piston to prevent its canting in the brake cylinder. It will be noted that the parts 37 pass on either side of the brake cylinder.

It will also be noted that the power from the pistons is applied at a point between the two pivot pins 39 and 50 and, having in mind the relative braking areas of the bands 25 and 26, the distance from the power application to the pivot 50 for the band 26 is made less than that from this point of application to the pivot 39. These distances are preferably in the ratio of 1 to 2.

No special form of built-in adjustment for the bands is here shown, but it may be provided if desired. However, such adjustment may be made by providing thrust-pins of various lengths which will provide definite brake clearances so that longer pins may be put in when the lining wears to such an extent that the travel of the pistons becomes more than necessary.

With this construction it will be noted that as the pistons are forced outwardly by the pressure fluid within the brake cylinder this pressure is transmitted to the floating levers 69 which are thereby moved outwardly causing the adjacent end of the band 26 to be forced into engagement with the drum and the adjacent end of the band 25 to be pulled so as to contract said band about its brake surface.

The release of the bands is accomplished through the springs 54, 33 and 46. The springs 54 tend to pull both of the bands or shoes away from their brake surfaces. Due to the lever construction, there will be a tendency for the contracting brake to release more readily and quickly than the expanding brake, but this is taken care of by limiting the movement of the lever 39, as by a stop screw 73 adjustably mounted in each lever 69 which comes into contact with the end of the brake cylinder as soon as the contracting band 25 is fully released and then upon any further travel of the piston the expanding brake 26 will be moved to release position by the springs 54 which then act to hold the two brake shoes in normal central position.

It will also be noted that in this construction a space is provided between the annular brake drum and the hub portion of the wheel, adjacent the wheel spokes, and the brake drum faces toward the vehicle so that any grease, oil, water or slush which may come up around the brake will readily drain out of this space through the openings between the spokes of the wheel. Furthermore, as the inside part of the drum projects over the outside of the housing which carries the main axle bearing for the wheel, any grease or oil which might work out from this bearing would not travel along the surface of this drum but would escape from the point nearest the exit, which is at the back of the drum, and would be disposed of in that manner. Thus, oil and grease, water or slush are effectively prevented from working into the brake drum and creating an undesirable condition in the brake surfaces.

It will be further noted that the anchor pins for both brake shoes or bands are offset relative to the center lines of said bands so that the tendency of self-application will assist the braking pressure when the vehicle is traveling straight ahead, and that these anchor pins are located the same distance from the center line with the same angular distance so that the respective shoes may be used interchangeably for either right or left hand rotation of the wheel without the necessity of providing right or left hand parts.

Figure 7:
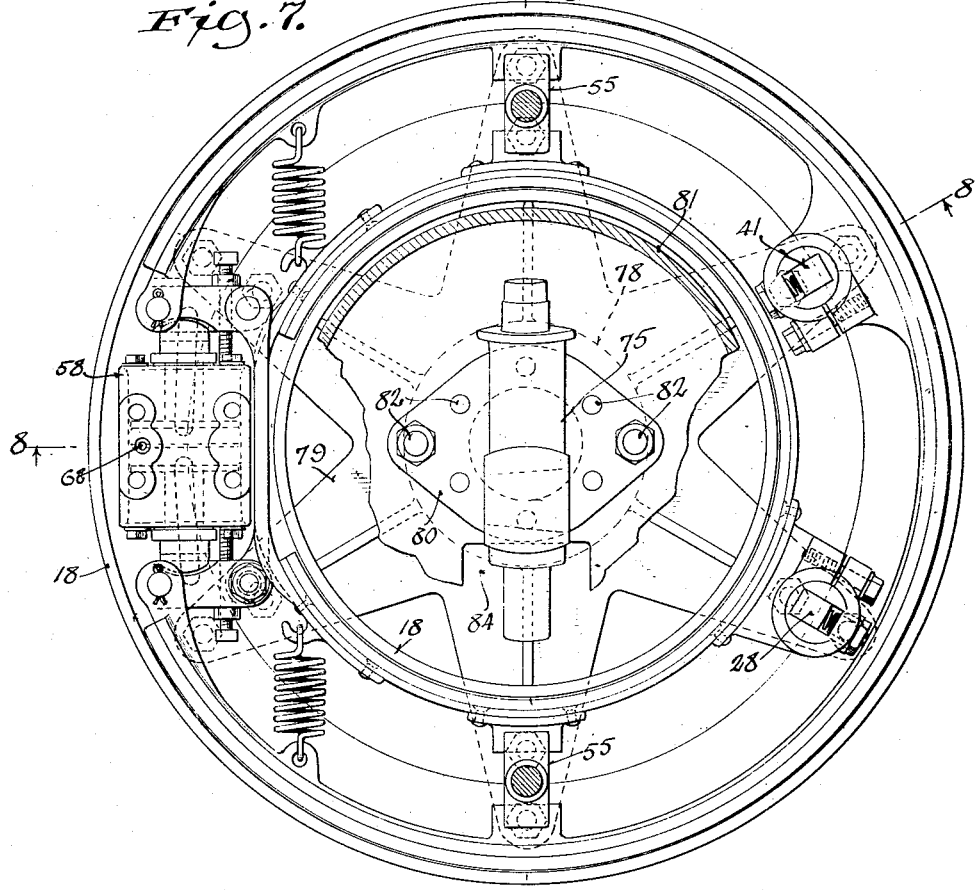
Fig. 7 is a section taken on the line 7—7 of Fig. 6.
Figure 8:
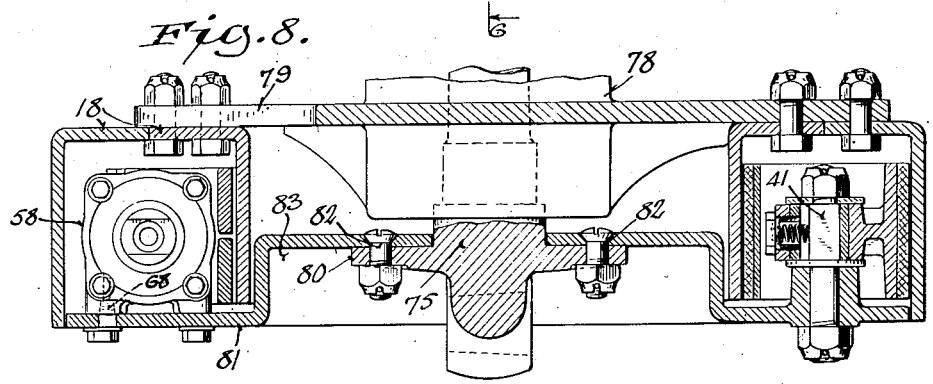
Fig. 8 is a section taken on the line 8—8 of Fig. 7 the brake cylinder being shown in full.

The same construction may be used for brakes for the front wheel with such modifications as to adapt it to the use of the dirigible wheel, and in Figs. 6, 7 and 8 I have shown one such modification in which the numeral 74 designates an axle of the Elliot type, 75 the steering knuckle, 76 the front wheel, here shown of the steel disk type, having its hub 78 provided with a spider 79 upon which the brake drum or drums composed of the annular stampings 18 are mounted, and the brake bands and their associated parts and operating means are similar to those described in the first construction and similarly designated. The principal modification is in the form and mounting of the brake-supporting means. In this instance the steering knuckle 75 is provided with a hub flange 80 to which the brake-supporting disk 81 is secured by bolts 82. This disk 81 has a recessed portion 83 to provide working clearance for the axle and knuckle, and with an opening 84 adjacent the lower end of the steering knuckle for this purpose. The disk 81 carries the anchor pins 28 and 41 and the guide members 55 and is similarly associated with the brake drum or drums. Furthermore, as the wheel is canted and the spider 79 provides drain openings, the water or slush will drain through these passages and will be prevented from entering the drum.

In Fig. 9 I have shown a reverse Elliot type of axle 85 having the forked steering knuckle 86, the front wheel 87 and the U-shaped drum of one piece construction bolted to said wheel with parts spaced therefrom to provide drain channels 88. As to the brakes, their operating mechanism and associated parts are the same as that described in connection with the rear axle, and the principal modification is in the brake-supporting means which, in this instance, consist of a disk 89 having a lug 90 formed thereon to take the end of a tapered shank 91 on the lower eyed portion 93 of the steering knuckle. An angle bracket 94 has one leg bolted to the top of the upper eyed portion 95 of the steering knuckle and its other leg or side bolted to the brake cylinder 58 and clamping the disk between it and said cylinder.

With the foregoing construction it will be noted that a brake acts on one side only of the adjacent brake drum so that a much more effective cooling is had, by reason of the exposed surface of said drum, than in that type of brake construction in which the bands or shoes engage opposite sides of the drum.

It will also be noted that the duplex brake drum herein provided forms separate and distinct brake surfaces which may be formed as a one-piece construction or of separate drums, and I, therefore, desire it to be understood that by the term "duplex brake drum" I mean either a one-piece construction or a pair of brake drums. When a pair of brake drums is used I prefer to so connect them as to form an annular channel with the brake bands disposed within said channel.

I desire it to be understood that this invention is not to be limited to any particular arrangement or construction of parts except in so far as such limitations are specified in the claims or necessitated by the prior art.

What I claim as my invention is:

1. In brake mechanism of the character described, the combination of concentric brake drums, brakes respectively engageable with said drums, a fluid-pressure-operated motor mounted between the brake surfaces of said drums for applying said brakes, and means to release said brakes.

2. In brake mechanism of the character described, the combination of concentric brake drums constructed and arranged to form an annular space between oppositely disposed braking surfaces, a contracting type brake within said space engageable with the inner brake surface, an expanding type brake within said space engageable with the opposite braking surface, a fluid-pressure-operated motor for actuating said brakes disposed within said space, means for releasing said brakes, and supporting means for said brakes.

3. In brake mechanism of the character described, the combination of concentric brake drums constructed and arranged to form an annular space between oppositely disposed braking surfaces and closed at one end, a contracting type brake within said space engageable with the inner brake surface, an expanding type brake within said space engageable with the opposite braking surface, a fluid-pressure-operated motor for actuating said brakes disposed within said space, means for releasing said brakes, and supporting means for said brakes covering the open end of said space.

4. In brake mechanism of the character described, the combination of concentric brake drums, of a pair of brake bands respectively engageable with one side only of said drums, a fluid-pressure-operated motor mounted in the space between the drums for conjointly operating said brakes, and means to release said brakes.

5. In brake mechanism of the character described, the combination of a duplex brake drum, of brakes working within said drum on opposite sides thereof, a fluid-pressure-operated motor mounted within said brake space of said drum for conjointly operating said brakes, and means to release said brakes.

6. In brake mechanism of the character described, the combination of a pair of complementary stampings mounted to form a duplex brake drum of U-shape in cross-section, brake members engageable with oppositely disposed braking surfaces within said drum, a fluid-pressure-operated motor mounted within the space between said braking surfaces for conjointly moving said brake members into braking engagement therewith, and means to release said brake members from said braking surfaces.

7. In brake mechanism of the character described, the combination of concentric brake drums constructed and arranged to form an annular space between oppositely disposed braking surfaces, a contracting type brake within said space engageable with the braking surface of small diameter, an expanding type brake within said space engageable with the braking surface of large diameter, levers operatively connecting the ends of said brakes whereby movement of said levers acts to apply both brakes, a fluid-pressure-operated motor having parts in thrusting engagement with said levers and operable to move the same to make a brake application, and means for releasing said brakes.

8. In brake mechanism of the character described, the combination of concentric brake drums constructed and arranged to form an annular space between oppositely disposed braking surfaces, a contracting type brake within said space engageable with the braking surface of small diameter, an expanding type brake within said space engageable with the braking surface of large diameter, levers operatively connecting the ends of said brakes whereby movement of said levers acts to apply both brakes, a fluid-pressure-operated motor having parts in thrusting engagement with said levers and operable to move the same to make a brake application, and means including springs secured to both brakes for releasing the same from said drums.

9. In a vehicle brake, the combination with the wheel to be braked and the brake-supporting means, of a brake drum mounted on said wheel and cooperating with said supporting means to form a brake enclosure, of a pair of brakes within said enclosure and engageable with spaced concentric parts of said drum, a fluid-pressure-operated motor within said enclosure and operatively connected to said brakes to actuate the same, and means within said enclosure to release said brakes.

10. In a vehicle brake, the combination with the wheel to be braked and the brake-supporting means, of a brake drum mounted on said wheel and cooperating with said supporting means to form a brake enclosure, of a pair of brakes within said enclosure and engageable with spaced parts of said drum, a fluid-pressure-operated motor within said enclosure and operatively connected to said brakes to actuate the same, and means within said enclosure to release said brakes, said enclosure being spaced from the inner part of said wheel and so arranged relative to the wheel as to allow oil, water or other foreign matter to drain out of the space between said enclosure and adjacent the running gear and thereby prevent its passage into said brake drum.

11. In a vehicle brake, the combination of concentric brake drums, brake members respectively cooperating with said drums, a fluid-pressure-operated motor disposed between said drums for applying said brakes, supporting means for said brakes and motor, guide means for the intermediate parts of said brake members to maintain them in alinement with said drums, and means to release said brakes.

12. In a brake mechanism of the character described, the combination of concentric inner and outer brake drums, a contracting type brake engageable with the braking surface of the inner drum, an expanding type brake engageable with the braking surface of the outer drum, levers operatively connecting the ends of said brakes together whereby movement of said levers acts to apply both brakes, means engaging an intermediate part of said levers to move the same to make a brake application, and means for releasing said brakes.

13. In a brake mechanism of the character described, the combination of concentric inner and outer brake drums, a brake support, a contracting type brake engageable with the braking surface of the inner drum, an expanding type brake engageable with the braking surface of the outer drum, means including an anchor-pin associated with said support and connected to the intermediate part of each brake member, said anchor-pins being offset so that the braking force applied to said brakes is augmented by the self-application of said brake when moving forwardly, means for simultaneously applying both brakes, and means to release said brakes.

In testimony whereof I affix my signature.

NIELS A. CHRISTENSEN.